US012729014B2

(12) United States Patent
Nielsen et al.

(10) Patent No.: US 12,729,014 B2
(45) Date of Patent: Sep. 8, 2026

(54) AIR HOSE

(71) Applicant: ILLINOIS TOOL WORKS INC., Glenview, IL (US)

(72) Inventors: Bo Vork Nielsen, Fäborg (DK); Joshua Spalding, Bradenton, FL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 408 days.

(21) Appl. No.: 18/243,428

(22) Filed: Sep. 7, 2023

(65) Prior Publication Data

US 2023/0417346 A1 Dec. 28, 2023

Related U.S. Application Data

(63) Continuation-in-part of application No. PCT/US2022/043066, filed on Sep. 9, 2022.

(Continued)

(30) Foreign Application Priority Data

Sep. 28, 2021 (GB) ..................................... 2113838

(51) Int. Cl.
*F16L 11/24* (2006.01)
*B64F 1/36* (2017.01)

(Continued)

(52) U.S. Cl.
CPC ............... *B64F 1/362* (2013.01); *F16L 11/11* (2013.01); *F16L 11/118* (2013.01); *F16L 11/24* (2013.01)

(58) Field of Classification Search
CPC .......... F16L 11/24; F16L 11/11; F16L 11/118; F16L 11/112; F16L 11/115; B64F 1/362
See application file for complete search history.

(56) References Cited

U.S. PATENT DOCUMENTS 4,683,917 A 8/1987 Bartholomew
8,752,591 B2 6/2014 Montalvo et al.
(Continued)

FOREIGN PATENT DOCUMENTS

CN 103486358 1/2014
CN 203517047 U 4/2014
CN 114893628 A 8/2022

OTHER PUBLICATIONS

PCT International Search Report, Form PCT/ISA/210, for International Application PCT/US2023/032246, Dec. 8, 2023 (6 pages).

*Primary Examiner* — Aaron M Dunwoody
(74) *Attorney, Agent, or Firm* — Pauley Erickson & Swanson

(57) ABSTRACT

An air hose includes a first component, a second, elastic component and one or more fastening positions and/or a continuous fastener. The first component has a first end and a second end, wherein the first and second ends of the first component define a first component length therebetween. The second component has a first end and a second end, wherein the first and second ends of the second component define a second component length therebetween. The one or more fastening positions and/or continuous fastener extends along the second component length and fastens the second component to the first component in an axial direction of the air hose. The air hose is operable between a first condition in which the second component length is less than the first component length and is collapsible in a radial direction, and a second condition in which the second component length is the same as the first component length and the first component is held against a biasing force of the second component such that the air hose is open in the radial direction.

24 Claims, 2 Drawing Sheets

Related U.S. Application Data

(60) Provisional application No. 63/456,245, filed on Mar. 31, 2023, provisional application No. 63/457,318, filed on Apr. 5, 2023.

(51) Int. Cl.
*F16L 11/11* (2006.01)
*F16L 11/118* (2006.01)

(56) References Cited

U.S. PATENT DOCUMENTS

| | | | | |
|---|---|---|---|---|
| 9,022,076 | B2 * | 5/2015 | Ragner | F16L 11/24 |
| 2018/0045340 | A1 | 2/2018 | Berardi | |
| 2019/0315489 | A1 | 10/2019 | Gonsette et al. | |

* cited by examiner 1
15
15
15
12
15
13
11
12
15
15
15
14
L1
X 1
12
15
13
11
12
15
14
L2

10
110
150
150
150
130
140
L10

10
110
130
140
L20

1'
15'
15'
12'
15'
13'
11'
12'
L1'
15'
15'
14'
X

1'
12'
13'
11'
12'
14'
L2'

10'
130'
150'
110'
150'
150'
140'
L10'

10'
130'
110'
140'
L20'

AIR HOSE

CROSS REFERENCE TO RELATED APPLICATIONS

This application is a continuation-in-part of PCT International Patent Application PCT/US2022/043066, filed on 9 Sep. 2022 which claims the priority of Great Britain Patent Application No. GB 2113838.3, filed 28 Sep. 2021; and claims the benefit of U.S. Provisional Applications, Ser. No. 63/456,245, filed on 31 Mar. 2023 and Ser. No. 63/457,318, filed on 5 Apr. 2023.

The above-referenced applications are hereby incorporated by reference herein in their entirety and are made a part hereof, including but not limited to those portions which specifically appear hereinafter.

BACKGROUND OF THE INVENTION

Field of the Invention

The invention relates to an air hose. In particular, the invention relates to an air hose for delivering air, for example pre-conditioned air, to an aircraft.

Description of Related Art

Pre-conditioned air systems are used to bring cooled or heated air into a parked aircraft. Air is supplied from a pre-conditioned air unit to cabins of the aircraft via air hoses, which are referred to as pre-conditioned air hoses, when the aircraft is grounded and an auxiliary power unit is not operational. Such air hoses are often around 18 metres in length, and the pre-conditioned air unit is typically mounted to a passenger boarding bridge at an airport.

There are two types of pre-conditioned air hoses, each of which requires a different storage system at a passenger boarding bridge.

The first type, known as flat hoses, do not have wire reinforcement and so may be flattened, when deflated, and rolled for storage. This is advantageous as a reel of flattened and rolled hose is relatively small, as compared to other airport equipment. The reel is compact and can be stored easily on the bridge, which is busy with other equipment. However, disadvantageously, the entire hose must be unrolled from the reel in order to get air through the hose. As the hose may be too long to be laid in a straight line, flat hoses are prone to kinking. Kinking in the hose may reduce or prevent the flow of air through the hose, reducing the capacity of the entire pre-conditioned air system.

The second type, known as spiral hoses, have a wire reinforcement. The spiral wire located in or around the circumference of the hose allows the hose to be axially compressed for storage. Spiral hoses are stored in big, bulky and costly hose retrievers. As passenger boarding bridges are busy with equipment, it can be difficult to get sufficient space for a hose retriever. In contrast to flat hoses, however, spiral hoses do not need to be fully extended in order for air to flow through the hose. This means that only the length of hose necessary to reach the aircraft from the storage position needs to be extracted from the hose retriever. The risk of kinking of spiral hoses is reduced or eliminated as the hose length can be laid in a straight line and the nature of the hose itself reduces the risk of kinking.

It would therefore be advantageous to provide a pre-conditioned air hose which overcomes some or all of these limitations. It would also be advantageous to provide a pre-conditioned air hose which is straightforward to manufacture.

SUMMARY OF THE INVENTION

According to an aspect of the invention there is provided an air hose comprising a first component, a second component and a plurality of fastening positions and/or a continuous fastener therebetween.

The first component may have a first end and a second end. The first and second ends of the first component may define a first component length therebetween.

The second component may be an elastic component. The second component may have a first end and a second end. The first and second ends of the second component may define a second component length therebetween.

The plurality of fasteners and/or the continuous fastener may extend along the second component length. The continuous fastener may fasten the second component to the first component, for example in an axial direction of the air hose.

The air hose may be operable between a first condition and a second condition. In the first condition, the second component length may be less than the first component length. In the first condition, the air hose may be collapsible in a radial direction. In the second condition, the second component length may be the same as the first component length. In the second condition, the first component may be held against a biasing force of the second component. In the second condition, the air hose may be open in the radial direction.

According to another aspect of the invention there is provided an air hose, the air hose comprising: a first component having a first end and a second end, wherein the first and second ends of the first component define a first component length therebetween, a second, elastic, component having a first end and a second end, wherein the first and second ends of the second component define a second component length therebetween, and a continuous fastener, wherein the continuous fastener extends along the second component length and fastens the second component to the first component in an axial direction of the air hose; and wherein the air hose is operable between: a first condition in which the second component length is less than the first component length and the air hose is collapsible in a radial direction, and a second condition in which the second component length is the same as the first component length and the first component is held against a biasing force of the second component such that the air hose is open in the radial direction.

Advantageously, when the air hose is in the second, extended or open, condition or configuration the biasing force of the second, elastic component prevents or obviates kinking, twisting or other entanglement of the hose. The second component remains in an extended state, wherein it applies the biasing force, even when the hose is bent or curved, thereby reducing or eliminating the likelihood and severity of kinking or twisting of the hose. This means that the supply of air, for example pre-conditioned air, is not impeded, and the capacity of the air system, for example the pre-conditioned air system, is not reduced. Further advantageously, when the hose is in the first, retracted, condition or configuration, it may be folded, rolled or otherwise arranged into a compact shape. This allows the hose to be stored efficiently. The continuous fastener by which the second component is fastened to the first component advantageously ensures that the manufacture of the air hose is efficient and straightforward.

The first component may be tubular. The first component may be, for example, an elongate tube. The first end may be a first open end and the second end may be, for example, a second open end. The axial direction of the hose may be defined between the first open end and the second open end of the first component. An axial distance or the first component length may be defined between the first open end and the second open end of the first component.

The air hose may be a flat air hose. In the first condition the hose may be flat or flattenable. In the second condition, the first component may be in a radially uncollapsed or expanded condition. That is, the first component may not be collapsed when in the second condition.

The axial distance or length between the first open end of the first component and the second open end of the first component may be greater when the hose is in the second, extended, condition than when the hose is in the first, retracted, condition.

The continuous fastener may extend along the entire length of the first component, between a first end and a second end of the first component. The continuous fastener may be stitching, hook and loop fasteners, bonding (for example using adhesive), adhesive tape, welding, crimping or any other suitable fastening means.

The second component may be located on the outside of the first component, for example on an outer surface of the first component. Alternatively, the second component may be located on the inside of the first component, for example on an inner surface of the first component. The first component may comprise a plurality of layers. The second component may be located between two layers of the first component. The plurality of layers of the first component may be tubular. The plurality of layers of the first component may be substantially concentric. The first component may comprise three layers. The second component may be located between an innermost layer and a middle layer of the first component. Alternatively, the second component may be located between a middle layer and an outermost layer of the first component.

The second component may comprises at least one elastic cord and/or at least one length of elastic material. The second component may, for example, comprise a plurality of elastic cords and/or a plurality of lengths of elastic material. In examples, the plurality of elastic cords and/or the plurality of lengths of elastic material may be distributed, for example equally spaced, around the circumference of the first component. The air hose may comprise a continuous fastener for each elastic cord and/or each length of elastic material.

The at least one elastic cord may be, for example, at least one elastic shock cord. The at least one elastic cord may be substantially axially aligned with the first component of the hose. The length of elastic material may be, for example, a length of rubber material or a length of an elasticated fabric.

The second component may comprises an elastic tube. The air hose, in this example, may comprise a plurality of continuous fasteners. The plurality of continuous fasteners may be distributed, for example equally spaced, around the circumference of the first component and/or the second component. The elastic tube may be, for example, a rubber material in a tubular shape, or an elastic material in a tubular shape. The elastic tube may be substantially concentric with the first component.

The air hose may be a pre-conditioned air hose. A first end of the pre-conditioned air hose may be configured for connection to an air supply, for example a pre-conditioned air supply. A second end of the pre-conditioned air hose may be configured for connection to an apparatus or device which is configured to receive air, for example pre-conditioned air.

The first component may be air-tight. The first component may be sufficiently air tight to transport air, for example pre-conditioned air, from an air supply, for example a pre-conditioned air supply, to the apparatus or device which is configured to receive air. The first component may be sufficiently air tight to deliver air to the apparatus or device which is configured to receive air at a desired pressure and/or flow rate.

The second, extended, condition may be an inflated condition. In the inflated condition air may flow through the hose, for example air may be pumped through the hose. The first, retracted, condition may be a deflated condition. In the deflated condition, no, or minimal, air may be supplied to and/or flow through the hose.

The second component may be elongate. The second component may comprise at least one resilient member. The second component may comprise a plurality of resilient members. The or each resilient member may extend along the axial direction of the hose.

The plurality of resilient members may be distributed around the circumference of the hose.

The first component may be less elastic than the second component. The first component may be inelastic, for example relatively inelastic compared to the second component.

The air hose may be for supplying air to an aeroplane, helicopter, or other aircraft.

Tension in the first component, when the hose is in the second, extended, condition, may prevent further extension of the second component.

According to another aspect of the present invention, there is provided an air hose, for example a pre-conditioned air hose, the air hose comprising a first component and a second, elastic component, wherein the second component is fastened to the first component at a plurality of fastening positions along the axial direction of the air hose, such that the air hose is operable between a first, e.g. retracted and/or deflated, condition in which the first component is slack between axially adjacent fastening positions and is collapsible in a radial direction, and a second, e.g. extended and/or inflated, condition in which axially adjacent fastening positions are separated against a biasing force of the second component.

Advantageously, when the air hose is in the second, extended, condition or configuration the biasing force of the second, elastic component prevents or obviates kinking, twisting or other entanglement of the hose. The second component remains in an extended state, wherein it applies the biasing force, even when the hose is bent or curved, thereby reducing or eliminating the likelihood and severity of kinking or twisting of the hose. This means that the supply of air, for example pre-conditioned air, is not impeded, and the capacity of the air system, for example the pre-conditioned air system, is not reduced. Further advantageously, when the hose is in the first, retracted, condition or configuration, it may be folded, rolled or otherwise arranged into a compact shape. This allows the hose to be stored efficiently.

The air hose may be a flat air hose. In the first condition the hose may be flat or flattenable. In the second condition, the first component may be in a radially uncollapsed or expanded condition. That is, the first component may not be collapsed when in the second condition.

The first component may be elongate. The first component may, for example, be tubular. The elongate and/or tubular first component may have a first end, for example a first open end, and a second end, for example a second open end. The axial direction of the hose may be defined between the first open end and the second open end of the first component. An axial distance or length of the first component may be defined between the first open end and the second open end of the first component.

The first component may be less slack between adjacent fastening positions when the hose is in the second, extended, condition than when the hose is in the first, retracted, condition. The axial distance or length between the first open end of the first component and the second open end of the first component may be greater when the hose is in the second, extended, condition than when the hose is in the first, retracted, condition. The adjacent fastening positions may be further apart along the axial direction of the hose when the first component of the hose is extended in the second condition than when the first component of the hose is retracted in the first condition.

The fastening positions may be discrete fastening positions. The fastening positions may be spaced apart. The fastening positions may be evenly distributed along the axial direction of the hose. The fastening positions may be distributed along the entire length of the first component, between a first end and a second end of the first component. There may be two fastening positions, for example a first fastening position at a first end of the first component and a second fastening position at a second end of the first component. There may be more than two fastening positions between the first end of the first component and the second end of the first component. The fastening of the second component to the first component may be via stitching, pins, rivets, ties, zip-ties, staples, hook and loop fasteners, snap-fit fasteners, bonding (for example using adhesive), adhesive tape, welding, crimping or buttons, or any other suitable fastening means. The fastening positions may be spaced along the axial direction by 180 mm.

The fastening positions may also be distributed around the circumference of the first component. The fastening positions may be at discrete positions around the circumference of the first component. The fastening positions may be evenly distributed around the circumference of the first component.

One of the first end, for example the first open end, or the second end, for example the second open end, may be connectable or connected to an air supply, for example a pre-conditioned air supply. The other of the first open end or the second open end may be connected or connectable to an apparatus or device which is configured to receive air, for example pre-conditioned air.

The first component may be air-tight. The first component may be sufficiently air tight to transport air, for example pre-conditioned air, from an air supply, for example a pre-conditioned air supply, to the apparatus or device which is configured to receive air. The first component may be sufficiently air tight to deliver air to the apparatus or device which is configured to receive air at a desired pressure and/or flow rate.

The second, extended, condition may be an inflated condition. In the inflated condition air may flow through the hose, for example air may be pumped through the hose. The first, retracted, condition may be a deflated condition. In the deflated condition, no, or minimal, air may be supplied to and/or flow through the hose.

The second component may be elongate. The second component may comprise at least one resilient member. The second component may comprise a plurality of resilient members. The or each resilient member may extend along the axial direction of the hose.

The plurality of resilient members may be distributed around the circumference of the hose.

The fastening positions may each correspond to a separate resilient member. The fastening positions may, for example, be in the form of a spiral stich, wherein a pitch of the spiral defines the distance between axially adjacent fastening positions.

The hose may further comprise a plurality of fastening points or fasteners via which the second component can be connected, attached or fastened to the first component. The plurality of fastening points or fasteners may be distributed along the axial direction of the hose. The plurality of fastening points may be distributed around the circumference of the hose. There may be two fastening points, for example a first fastening point at a first end of the hose and a second fastening point at a second end of the hose. There may be more than two fastening points between the first end of the hose and the second end of the hose.

The first component may be less elastic than the second component. The first component may be inelastic, for example relatively inelastic compared to the second component.

The air hose may be for supplying air to an aeroplane, helicopter, or other aircraft.

In the second, extended, condition the first component may be taut, or held in tension, between axially adjacent fastening positions. The first component may be stretched between fastening positions which are adjacently positioned along the axial length of the first component of the hose. Tension in the first component, when the hose is in the second, extended, condition, may prevent further extension of the second component.

The second component may be located on the outside of the first component, for example on an outer surface of the first component. Alternatively, the second component may be located on the inside of the first component, for example on an inner surface of the first component. The first component may comprise a plurality of layers. The second component may be located between two layers of the first component. The plurality of layers of the first component may be tubular. The plurality of layers of the first component may be substantially concentric. The first component may comprise three layers. The second component may be located between an innermost layer and a middle layer of the first component. Alternatively, the second component may be located between a middle layer and an outermost layer of the first component.

The second component may comprise at least one elastic cord, for example an elastic shock cord. The at least one elastic cord may be substantially axially aligned with the first component of the hose. A plurality of elastic cords may be distributed, for example evenly distributed, around the circumference of the hose.

The second component may comprise at least one spring. The at least one spring may be substantially axially aligned with the hose. A plurality of springs may be distributed, for example evenly distributed, along the length of the hose. A plurality of springs may be distributed, for example evenly distributed, around the circumference of the hose.

The second component may comprise an elastic material, for example a rubber material or an elasticated fabric.

The second component may comprise an elastic tube, for example a rubber material in a tubular shape, or an elastic material in a tubular shape. The elastic tube may be substantially concentric with the first component.

According to a further aspect of the invention, there is provided a method of manufacturing the aforementioned air hose, wherein the second component is extended before being fastened to the first component, and axial tension is applied to the first component to reduce the slack to below that present when the hose assembly is in the first condition, before being fastened to the second component.

The second component may be extended by at least 100%, for example at least 120%, preferably at least 150% before being fastened to the first component. The percentage extension of the second component is defined as the extended length of the second component (L2) divided by the length of the second component immediately before extension (L1), multiplied by 100%.

In other words:

$$\frac{L2}{L1} \times 100 = \%\ \text{extension}$$

BRIEF DESCRIPTION OF THE DRAWINGS

Example embodiment(s) of the invention are illustrated in the accompanying drawings, in which.

DESCRIPTION OF PREFERRED EMBODIMENTS

The illustrative embodiments relate to air hoses, which may be pre-conditioned air hoses.

The air hose is intended for use with an aeroplane. However, the air hose can be used with any suitable aircraft.

Figures 1, 2, 3, 4:
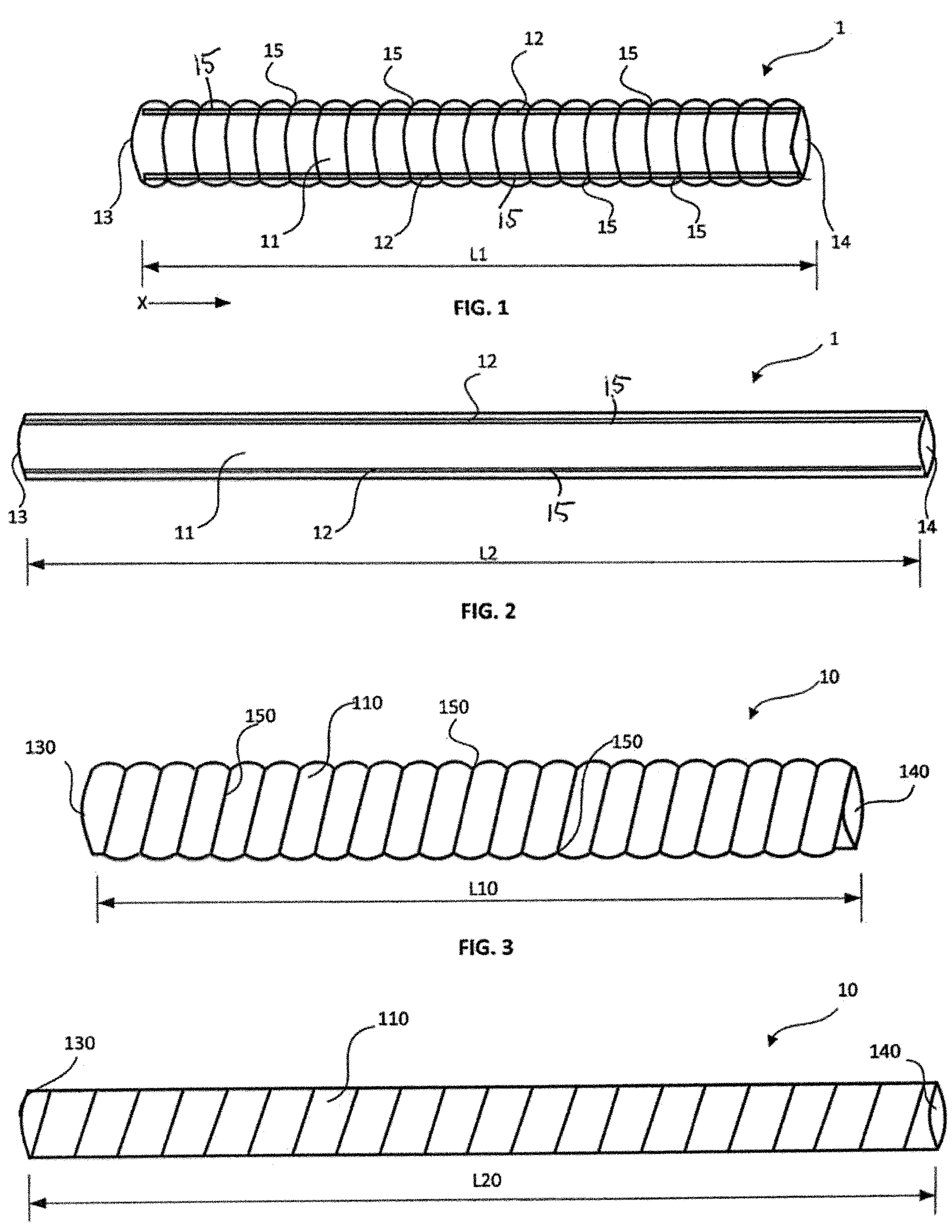
FIG. 1 illustrates a first example of an air hose in a deflated condition.
FIG. 2 illustrates the air hose of FIG. 1 in an inflated condition.
FIG. 3 illustrates a second example of an air hose in a deflated condition.
FIG. 4 illustrates the air hose of FIG. 3 in an inflated condition.

Referring to FIGS. 1 and 2, there is shown an air hose 1, hereinafter referred to as the hose 1. The hose 1 is shown in a retracted or deflated condition in FIG. 1, and in an extended or inflated condition in FIG. 2. The hose 1 has a first open end 13 and a second open end 14. The first end 13 is connectable to an air supply (not shown). The second end 14 is connectable to apparatus for receiving air (not shown). The hose 1 has a first component 11 and a second component 12. The first component 11 is a tubular material which is suitable for use in an air hose. In this example, the first component 11 comprises three, concentric layers. The first component 11 provides a conduit which is sufficiently air-tight to transfer air from the first end 13 to the second end 14 at the desired pressure and/or flow rate.

The second component 12, in this example, comprises a plurality of elastic cords 12. The elastic cords may be of any suitable diameter, for example 6 mm or 8 mm. The elastic cords 12 are substantially aligned with the axial direction of the hose 1. In this example four equally spaced elastic cords 12 are provided around the circumference of the hose (although only two are visible in FIGS. 1 and 2). However, any number of elastic cords 12 may be provided, for example two, three, five or six. In this example the elastic cords 12 are located between an innermost layer of the first component 11 and a middle layer of the first component 11. However, it will be appreciated that the elastic cords 12 may be located inside of the first component 11, on the outside of the first component 11, or between the middle layer and an outermost layer of the first component 11. The elastic cords 12 are fastened to the first component 11 at discrete, spaced fastening positions 15 along the axial direction X of the hose 1. In this example, the fastening positions 15 are spaced along the axial direction by 180 mm. Fastening is via any suitable means, such as stitching, pins, rivets, ties, zip-ties or staples. Between the fastening positions 15 the elastic cords 12 are not fastened to the first component 11. Between the fastening positions 15 the first component 11 is slack when in the retracted or deflated condition as shown in FIG. 1.

The elastic cords 12 have an unstretched length L1, as is shown in FIG. 1, in which the elastic cords are held in a straight configuration, immediately before any extension to the elastic cords 12. The first component has a length L2, as shown in FIG. 2, when the first component 11 is held taut. In the inflated or extended condition of FIG. 2 the first component 11 is taut, the elastic cords 12 are extended to a length L2, and the hose 1 is straight. However, it will be appreciated that in the inflated condition the hose 1 may be bent or curved, for example if the hose 1 is too long once it is fully unrolled for use.

The hose 1 is assembled by first holding the first component 11 at length L2, and by extending the elastic cords 12 to a length of L2. The elastic cords 12 are fastened to each of the fastening positions on the first component 11 when the elastic cords 12 and the first component 11 have a length of L2. Once fastened together, the elastic cords 12 are allowed to return to a length of L1 such that the slack is provided in the first component 11 between the fastening positions due to the biasing force of the elastic cords 12 contracting, or crimping, the first component 11. In this example, the elastic cords 12 are extended by 150% before being fastened to the first component 11. For example, to achieve a percentage extension of 150% in the second component 12 such that the length (L2) of the hose is 18 m, the length of the second component immediately before extension (L1) is 12 m using the following formula:

$$\frac{L2}{L1} \times 100 = \%\ \text{extension}$$

In use, the hose 1 is operable between the deflated or retracted condition and the inflated or extended condition. When in the deflated condition the hose 1 is collapsible, such that it is flat or flattenable, and is able to be rolled, or folded, for storage. This means that the hose 1 can be stored compactly, easily and efficiently. The hose 1 is unrolled or unfolded, and inflated to the inflated or extended condition, by pumping air through the hose 1. When inflated the hose 1 is not collapsed and axially adjacent fastening positions are separated against the biasing force of the elastic cords

12. In this example, the elastic cords 12 are able to extend until the first component 11 is taut between fastening positions. In this example, the elastic cords 12 extend to 150% of the unstretched length, when the hose 1 is in a straight configuration in the inflated or extended condition. The second component 12 may, in some cases, also extend axially and/or circumferentially in the inflated condition. When the hose 1 is curved or bent, for example to travel or reach around other equipment, the biasing forces acting on the first component 11 by the elastic cords 12 reduce, or eliminate, the severity and likelihood of kinking of the hose 1. This means that the correct pressure and/or flow rate of air can be maintained.

When the supply of air to the hose 1 is stopped, the hose 1 deflates and returns to the deflated or retracted condition. The elastic cords 12 contract to introduce the slack into the first component 11, and the hose 1 returns to a length of L1. This means that the hose 1 offers no resistance to rolling, or folding, for efficient storage, for example on a reel on the passenger boarding bridge.

Referring now to FIGS. 3 and 4 there is shown a second example of an air hose FIG. 3 shows the hose 10 in a deflated or retracted condition, and FIG. 4 shows the hose in an inflated or extended condition. This example is the same as the hose 1 described with reference to FIG. 1, with the exception that the second component is an elastic hose (not shown). Like features between this hose 10 and the hose 1 of the previous example are denoted with like reference numerals with a succeeding '0'. The elastic hose 10 is tubular in shape and is manufactured from an elastic material such as an elastic fabric. In this example the first component 110 comprises two layers, but it will be appreciated that the first component 110 could be the same as that in the previous example. The elastic hose is located between the layers of the first component 110 and is stitched thereto, the stitching being a spiral shape with respect to the axial direction of the hose. It will be appreciated that the elastic hose could be located on the inside, or outside, of the first component 11 instead. It will also be appreciated that multiple elastic hoses could be provided at different positions. For example, elastic hoses could be provided in any combination of being inside of the first component 110, outside of the first component 110, or between any number of a plurality of layers of the first component 110. The spacing of axially adjacent fastening positions is provided by the pitch of the spiral stitching. When the elastic hose is unstretched, the first component 110 is slack between any two axially adjacent positions on the stitching.

The hose 10 is manufactured in a similar way to the hose 1 of the previous example, whereby the elastic hose is stretched to a length of L20, the first component 110 is held taut at a length of L20, and the elastic hose is stitched to the first component 110 while both the elastic hose and the first component 110 are at a length of L20. The elastic hose is then allowed to return to an unstretched length of L10, thereby slackening the first component 110 between axially adjacent fastening positions 150. As in the previous example, the extension of the elastic hose is 150%, as provided by the following formula:

$$\frac{L20}{L10} * 100\% = 150\%$$

As with the hose 1 of the previous example, the hose 10 of this example is operable between an inflated or extended condition and a deflated or retracted condition. In the inflated condition the elastic hose is stretched, and the slack in the first component 110 between axially adjacent fastening positions 150 is reduced to reduce, or eliminate, the likelihood and severity of kinking of the hose 10. This enables the correct pressure and/or flow rate of air to be supplied. When the hose 10 is deflated, the elastic hose contracts and reintroduces slack into the first component 110 between axially adjacent fastening positions 150. In the deflated condition the hose 10 can be rolled or folded into storage, such that it can be stored efficiently on the passenger boarding bridge.

Figures 5, 6, 7, 8:
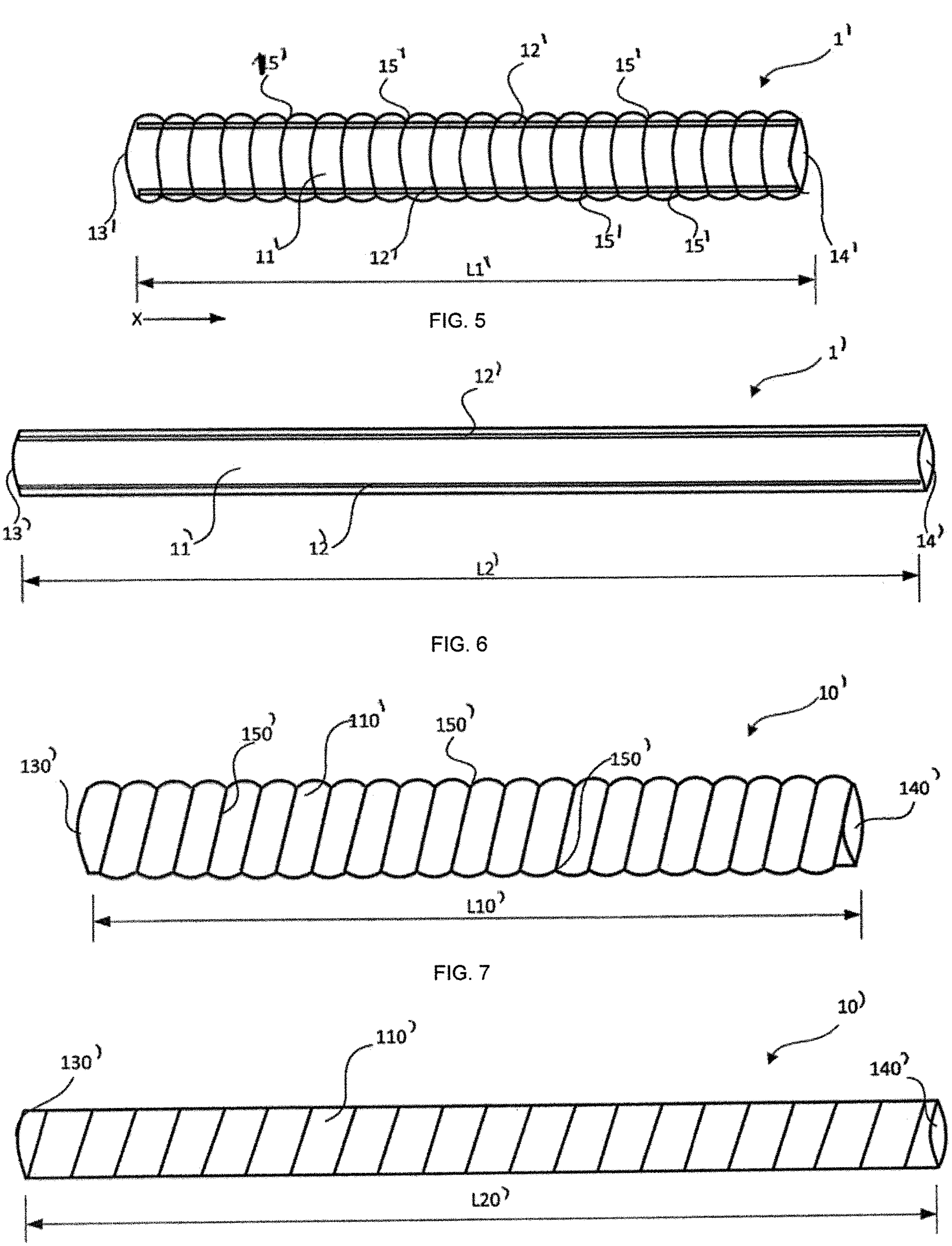
FIG. 5 illustrates a third example of an air hose in a deflated condition.
FIG. 6 illustrates the air hose of FIG. 5 in an inflated condition.
FIG. 7 illustrates a fourth example of an air hose in a deflated condition.
FIG. 8 illustrates the air hose of FIG. 7 in an inflated condition.

Referring now to FIGS. 5 and 6 there is shown a third example of an air hose 1'. FIG. 5 shows the hose 1' in a deflated or retracted condition, and FIG. 6 shows the hose 1' in an inflated or extended condition. This example is similar to the hose 1 described with reference to FIG. 1. Like features between this hose 1' and the hose 1 of the first example are denoted with like reference numerals with a succeeding '.

The air hose 1' of this example has a second component 12' which comprises a plurality of elastic cords 12'. The plurality of elastic cords 12' are fastened to the first component 11' by a corresponding plurality of continuous fasteners 15', which extend along the axial direction X of the hose 20. In this example, each continuous fastener 15' extends along the length of a corresponding elastic cord 12'. Fastening is via any suitable continuous means, such as continuous stitching. In this example, the elastic cords 12' are fastened to the first component 11' along the entire length of the elastic cords 12'.

The hose 1' is manufactured in a similar way to the hose 1 of the first example, whereby the elastic cords 12' are stretched to a length of L2', the first component 11' is held taut at a length of L2', and the elastic cords 12' stitched to the first component 11' while all of the elastic cords 12' and the first component 11' are at a length of L2'. Continuous stitching is applied along the length of the elastic cords 12'. The elastic cords 12' are then allowed to return to an unstretched length of L1'. As in the first example, the extension of the elastic cords 12' is 150%, as provided by the following formula:

$$\frac{L2'}{L1'} * 100\% = 150\%$$

As with the hose 1 of the first example, the hose 1' of this example is operable between an inflated or extended condition and a deflated or retracted condition. In the inflated condition the elastic cords 12' are stretched, and the first component 11' is taut along its axial length to reduce, or eliminate, the likelihood and severity of kinking of the hose F. This enables the correct pressure and/or flow rate of air to be supplied. When the hose 1' is deflated, the elastic cords 12' contract and reintroduces slack into the first component 11'. In the deflated condition the hose 1' can be rolled or folded into storage, such that it can be stored efficiently on the passenger boarding bridge.

A fourth example of an air hose 10' is shown in FIGS. 7 and 8. FIG. 7 shows the hose 10' in a deflated or retracted condition, and FIG. 8 shows the hose 10' in an inflated or extended condition. This example is similar to the hose 10 described with reference to FIG. 3. Like features between this hose 10' and the hose 10 of the second example are denoted with like reference numerals with a succeeding '.

In this example, the second component is an elastic hose (not shown) which is located between the layers of the first component 110' and is stitched thereto, the stitching being continuous stitching 150' which extends along the axial length of the hose. It will be appreciated that the elastic hose could be located on the inside, or outside, of the first component 110' instead. For example, elastic hoses could be provided in any combination of being inside of the first component 110', outside of the first component 110', or between any number of a plurality of layers of the first component 110'. When the elastic hose is unstretched, the first component 110' is slack. It will also be appreciated that multiple lengths of continuous stitching could be provided at different positions around the circumference of the air hose 10'.

The hose 10' is manufactured in a similar way to the hose 10 of the example of FIG. 3, whereby the elastic hose is stretched to a length of L20', the first component 110' is held taut at a length of L20', and the elastic hose is stitched to the first component 110' while both the elastic hose and the first component 110' are at a length of L20'. The elastic hose is then allowed to return to an unstretched length of L10'. As in the previous examples, the extension of the elastic hose is 150%, as provided by the following formula:

$$\frac{L20'}{L10'} * 100\% = 150\%$$

As with the hoses 1, 10, 1' of the previous examples, the hose 10' of this example is operable between an inflated or extended condition and a deflated or retracted condition. In the inflated condition the elastic hose is stretched, and the first component 110' is taut to reduce, or eliminate, the likelihood and severity of kinking of the hose 10'. This enables the correct pressure and/or flow rate of air to be supplied. When the hose 10' is deflated, the elastic hose contracts and reintroduces slack into the first component 110'. In the deflated condition the hose 10' can be rolled or folded into storage, such that it can be stored efficiently on the passenger boarding bridge.

It will be appreciated that several variations of the aforementioned examples are envisaged. For example, springs may be provided instead of elastic cords. A plurality of springs may be located along the axial direction of the hose. By way of another example, the elastic tube may be stitched to the first component with parallel lines of stitching around the circumference of the hose, instead of spiral stitching.

It will also be appreciated that, in examples of the invention, the second elastic component or components may be fastened to the first component by a continuous fastener, for example by continuous stitching or other continuous fastening means.

The invention claimed is:

1. An air hose comprising:

a first tubular component and a second, elastic tube;

wherein the second tube is fastened to the first component via a plurality of fasteners at a plurality of discrete fastening positions, wherein the plurality of discrete fastening positions are evenly distributed along the axial direction of the air hose, such that the air hose is operable between a first condition in which the first component is slack between axially adjacent fastening positions and collapsible in a radial direction, and second condition in which axially adjacent fastening positions are separated against a biasing force of the second tube.

2. The air hose according to claim 1, wherein in the first condition the hose is flat or flattenable.

3. The air hose according to claim 1, wherein the fastening positions are also distributed around a circumference of the air hose.

4. The air hose according to claim 1, wherein in the second condition the first component is taut between axially adjacent fastening positions.

5. The air hose according to claim 1, wherein the first component comprises a plurality of layers, and the second tube is located between two layers of the first component.

6. The air hose according to claim 1, wherein the plurality of fastening positions are distributed around the circumference of the first component.

7. The air hose according to claim 1, wherein the air hose is a pre-conditioned air hose.

8. The air hose according to claim 7, wherein a first end of the pre-conditioned air hose is configured for connection to an air supply.

9. The air hose according to claim 8, wherein a second end of the pre-conditioned air hose is configured for connection to an apparatus or device which is configured to receive air.

10. The air hose according to claim 1, wherein the plurality of fastening positions comprise a continuous fastener, wherein the continuous fastener extends along the second tube length and fastens the second tube to the first component in an axial direction of the air hose.

11. A method of manufacturing an air hose according to claim 1, wherein the second tube is extended before being fastened to the first component, and axial tension is applied to the first component to reduce the slack to below that present when the air hose assembly is in the first condition, before being fastened to the second tube.

12. The method according to claim 11, wherein the second tube is extended to 150% before being fastened to the first component.

13. The air hose according to claim 1, wherein the first component comprises a plurality of layers, and the second tube is located between two layers of the first component.

14. The air hose according to claim 1, wherein the second tube comprises at least one elastic cord and/or at least one length of elastic material.

15. The air hose according to claim 14, wherein the second tube comprises a plurality of elastic cords and/or a plurality of lengths of elastic material.

16. The air hose according to claim 15, wherein the plurality of elastic cords and/or the plurality of lengths of elastic material are distributed equally spaced around the circumference of the first component.

17. The air hose according to claim 14, wherein the air hose comprises a continuous fastener for each elastic cord and/or each length of elastic material.

18. An air hose comprising:

a first tubular component having a first end and a second end, wherein the first and second ends of the first component define a first component length therebetween;

a second, elastic, tube having a first end and a second end, wherein the first and second ends of the second tube define a second component length therebetween;

a continuous fastener, wherein the continuous fastener extends along the second tube length and fastens the second tube to the first component in an axial direction of the air hose; and wherein the air hose is operable between:

a first condition in which the second tube length is less than the first component length and the air hose is collapsible in a radial direction, and a second condition in which the second tube length is the same as the first component length and the first component is held against a biasing force of the second tube such that the air hose is open in the radial direction.

19. The air hose according to claim 18, wherein the first component is tubular.

20. The air hose according to claim 18, wherein in the first condition the air hose is flat or flattenable.

21. The air hose according to claim 18, wherein the continuous fastener is continuous stitching.

22. The air hose according to claim 18, wherein the air hose is a pre-conditioned air hose.

23. The air hose according to claim 22, wherein a first end of the pre-conditioned air hose is configured for connection to an air supply.

24. The air hose according to claim 23, wherein a second end of the pre-conditioned air hose is configured for connection to an apparatus or device which is configured to receive air.

* * * * *